United States Patent [19]
Johnson

[11] Patent Number: 4,708,022
[45] Date of Patent: Nov. 24, 1987

[54] FLUID FLOW MONITORING

[75] Inventor: Rodney C. Johnson, Sussex, Great Britain

[73] Assignee: Bestobell Sparling Limited, Sussex, Great Britain

[21] Appl. No.: 875,310

[22] Filed: Jun. 17, 1986

[30] Foreign Application Priority Data

Jun. 25, 1985 [GB] United Kingdom ................ 8516032

[51] Int. Cl.$^4$ .............................................. G01F 1/66
[52] U.S. Cl. ................................................ 73/861.28
[58] Field of Search ............ 73/861.27, 861.28, 861.29

[56] References Cited

U.S. PATENT DOCUMENTS 4,232,548 11/1980 Baumoel .
4,308,754 1/1982 Pederson et al. .

FOREIGN PATENT DOCUMENTS 2010483 3/1982 United Kingdom .
2131173 6/1984 United Kingdom .

Primary Examiner—Charles A. Ruehl
Attorney, Agent, or Firm—Robbins & Laramie

[57] ABSTRACT

An interface system (5) for connection to a fluid flow monitoring assembly is described. The monitoring assembly comprises a signal generating assembly and a signal receiving assembly (8,9) for transmitting signals into a flowing fluid and for receiving the signals after transmission through the fluid respectively; and a monitoring assembly (1) for controlling the transmission of signals by the signal generating assembly, sensing the signals received by the signal receiving assembly, and thereby monitoring the fluid flow. The signal generating and receiving assemblies (8,9) are adapted to transmit and receive signals passing through the fluid along at least two paths and the monitoring assembly (1) has one communication port for each transmission path. The interface system (5) comprises first and second converting assemblies linked by a common signal path (6), the first converting assembly (4) being connectable with the communication ports and the second converting assembly being connectable to the signal generating and receiving assemblies (8,9). The converting assemblies (4,7) are arranged to pass first signals along the signal path (6) in response to the receipt of signals from the communication ports or from the signal receiving assembly respectively, the first converting assembly (4) being responsive to first control signals to cause signals corresponding to signals received from the common signal path (6) to be passed to appropriate ones of the communication ports, and the second converting assembly (7) being responsive to second control signals to cause signals to be transmitted into the fluid by the signal generating assembly along appropriate paths.

17 Claims, 7 Drawing Figures

FLUID FLOW MONITORING

FIELD OF THE INVENTION

The invention relates to the field of fluid flow monitoring.

DESCRIPTION OF THE PRIOR ART

Typical fluid flow monitoring assemblies are of the kind comprising signal generating means and signal receiving means for transmitting signals into a flowing fluid and for receiving the signals after transmission through the fluid respectively; and monitoring means for controlling the transmission of signals by the signal generating means, sensing the signals received by the signal receiving means, and thereby monitoring the fluid flow. Such assemblies are hereinafter referred to as of the kind described.

Typically, the signal generating and receiving means comprise one or more transmitter/receiver pairs.

An example of an assembly of the kind described is illustrated in our British Pat. application No. 2,131,173.

In this specification, it should be understood that the term "fluid" includes both liquids and gases.

There are several techniques by which the flow velocity of a fluid can be measured, but all suffer from the same difficulty. This difficulty is the great difference between the velocity of the signals (normally acoustic, particularly ultrasonic signals) in the fluid and the actual velocity of the flow itself. For example, in the case of water, ultrasound will travel through the water at approximately 1500 m/sec, while typical flow velocities lie between 0.3 and 5 m/sec. Because the velocity of these signals is basically an unknown factor (being sensitive to pressure, temperature, fluid etc) this needs to be compensated for before a value relating to flow velocity can be satisfactorily obtained. One way in which this can be done is to pass signals through the fluid along different paths, in opposite directions, ie. with components with and against the direction of flow. It is this method on which the system illustrated in our earlier British Pat. specification No. 2,131,173 is based.

The net result of this particular system is two times of flight, one for the upstream direction and one for the downstream direction. Contained in the two times is the information necessary to be able to compute both the signal speed velocity and the flow velocity.

One difficulty that has proved insurmountable in the past is that due to the flow component in the two derived times (upstream and downstream) being very small (in the order of $10^{-8}$ seconds) the cables connecting the transmitters (transducers) to the processing electronics can give differential delays of an unsatisfactory magnitude in addition to the normal flow component.

In the past, this has meant that the cables (usually coaxial cables) must be made as short as possible. In many cases, cable lengths of greater than 30 meters should be avoided. This means that the flowmeter must be close to the fluid flow path (typically defined by a pipe) which in many applications makes it difficult for access to be gained to the flowmeter.

SUMMARY OF THE INVENTION

In accordance with one aspect of the present invention, we provide interface means for connection to a fluid flow monitoring assembly of the kind described in which the signal generating and receiving means is adapted to transmit and receive signals passing through the fluid along at least two different paths and the monitoring means has one communication port for each transmission path, the interface means comprising first and second converting assemblies linked by a common signal path, the first converting assembly being connectable with the communication ports and the second converting assembly being connectable to the signal generating and receiving means, wherein the converting assemblies are arranged to pass first signals along the signal path in response to the receipt of signals from the communication ports or from the signal receiving means respectively, the first converting assembly being responsive to first control signals to cause signals corresponding to signals received from the common signal path to be passed to appropriate ones of the communication ports, and the second converting assembly being responsive to second control signals to cause signals to be transmitted into the fluid by the signal generating means along appropriate paths.

With this invention, the problem of differential delays encountered when using a number of cables to carry the signals is avoided by making use of a common signal path, typically a single coaxial cable or transmission line.

In this specification, the "two different paths" includes transmission along the same physical path but in opposite directions.

In some cases, the control signals may be generated separately within each converting assembly so that the first and second converting assemblies pass received signals to the communication ports and cause appropriate signals to be transmitted respectively in a predetermined order. However this requires accurate synchronisation between the converting assemblies.

Preferably therefore one converting assembly includes means for generating control signals which are passed along the signal path in association with the first signals from that converting assembly and constitute the control signals for the other converting assembly. Preferably, the converting assembly which generates the control signals is the first converting assembly connected to the communication ports.

The control signals may be generated separately from the first signals or alternatively may be provided by a modulation of the first signals.

Preferably, the first converting assembly comprises a power supply generator for generating a power supply signal which is passed to the second converting assembly. This avoids the need for the second converting assembly to have its own power supply. In this case, the control signals preferably comprise modulations of the power supply signal.

The control signals may conveniently comprise pulses of different widths, the widths corresponding to the different directions in which signals are transmitted through a fluid in use.

In accordance with a second aspect of the present invention, a method of operating a fluid flow monitoring assembly of the kind described in which the generating and receiving means is adapted to transmit and receive signals passing through the fluid along at least two different paths and the monitoring means has one communication port for each transmission path, in combination with interface means according to the first aspect of the invention comprises (1) passing a first transmit signal along the common signal path in association with a transmission direction control signal to cause a signal to be transmitted into the fluid along one path;

(2) sensing for a signal at a communication port representing the receipt by the signal receiving means of a signal transmitted through the fluid;

(3) passing a second transmit signal along the common signal path in association with a transmission direction control signal to cause a signal to be transmitted into the fluid along another path; and (4) sensing for a signal at another communication port representing the receipt by the signal receiving means of the signal transmitted through the fluid.

Steps (1) to (4) may be repeated as often as desired.

This method of operation prevents any interference between signals transmitted along the common path.

It is believed that with this invention, it is possible to use a common signal path up to at least 1500 meters long and possibly up to as much as 4000 meters.

Another problem which is becoming particularly important in connection with fluid flow monitoring is the requirement of intrinsic safety (IS). Even in previous conditions which were considered safe, experience is showing that many locations are potentially lethal. The building up of methane gas in pits or instrumentation areas is now known to be far more common than previously thought. Due to difficulties encountered with normal flow monitor installations, history has shown that very often the working flow monitor has to be observed with instruments that can never be intrinsically safe themselves. In other words, if the flow monitor were made intrinsically safe, normal investigative work would not be able to be carried out in a dangerous area.

In accordance with a third aspect of the present invention, we provide interface means for connecting the signal generating and receiving means to the monitoring means of a fluid flow monitoring assembly of the kind described, the interface means comprising first and second converting assemblies, the first converting assembly coupling a transmit pulse from the monitoring means into a transmission medium in use for conveying the signal and a power supply signal to the second converting means which is responsive to the power supply signal to convert the transmit pulse from the transmission medium to a pulse for application to the signal generating means.

With this arrangement, the second converting assembly does not require a separate power source and will derive its power from the transmitted signals.

Preferably, the first converting assembly includes an IS barrier such that the voltage level on the downstream side of the barrier remote from the monitoring means is at a controlled low level. A typical voltage level will be 12 volts.

Typically the transmit pulse will have a relatively high frequency while the signal transmitted along the transmission medium will have a relatively low frequency. This is particularly important where the transmission medium is coaxial cable since attenuation of any coaxial cable rises quite considerably as the frequency increases and although one may transmit a high speed spike into a long length of cable, the signal at the far end will be a mass of much lower frequency signals. If a relatively pure 1 MHz sine wave is transmitted along the cable we will get only pure attenuation as the distortion. By relating this sine wave signal, time wise, to the high speed spike—and providing we can take a known point on the received signal then we can retain the original time reference point.

BRIEF DESCRIPTION OF THE DRAWINGS

Two examples of fluid flow monitoring assemblies incorporating interface means according to the invention will now be described with reference to the accompanying drawings, in which.

DETAILED DESCRIPTION OF THE EMBODIMENTS

Figure 1:
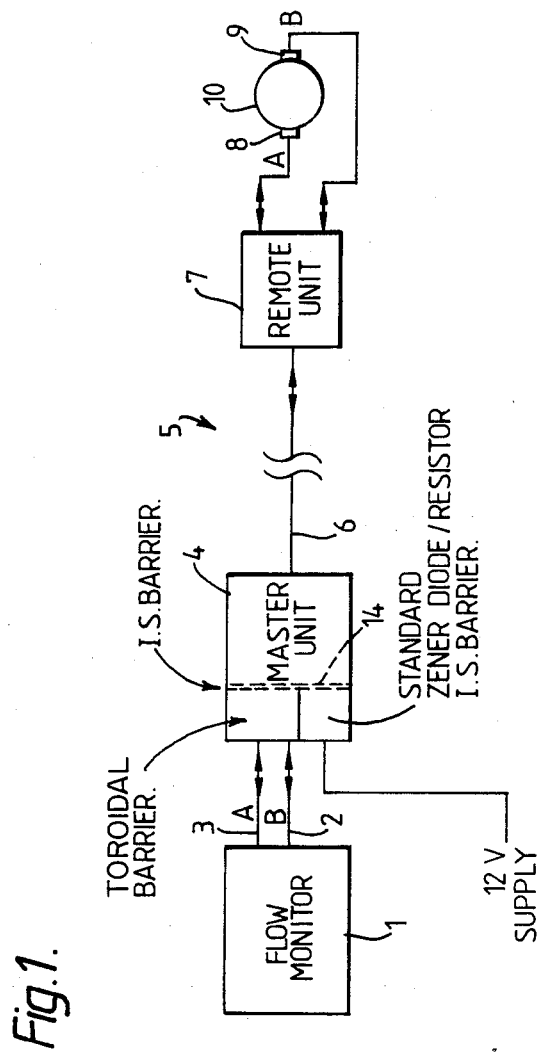
FIG. 1 is a block diagram of one example of the monitoring assembly.

The monitoring assembly shown in FIG. 1 comprises a flow monitor 1 having a pair of communication ports for transmitting and receiving signals corresponding to channels A and B respectively. This flow monitor may be the same as is described in our earlier British Pat. specification No. 2,131,173 and the disclosure in that specification is incorporated herein by reference. Electrical leads 2, 3 from the monitor 1 are connected to a master unit 4 of an interface system 5. A single coaxial cable 6 connects the master unit 4 with a remote unit 7 of the interface system 5. The remote unit 7 includes a pair of ports connected to respective piezoelectric transducers 8, 9 corresponding to the channels A, B respectively. The transducers 8, 9 are mounted on a pipe 10 through which a fluid flows and in response to a high frequency pulse inject an ultrasonic signal into the fluid.

Master Unit

The master unit includes an intrinsically safe (IS) barrier 14. For the 12 V supply this may be constituted by a standard diode shunt while for the channels A, B the IS barrier comprises toroidal transformers 11, 12 (FIGS. 2, 3).

Figure 2:
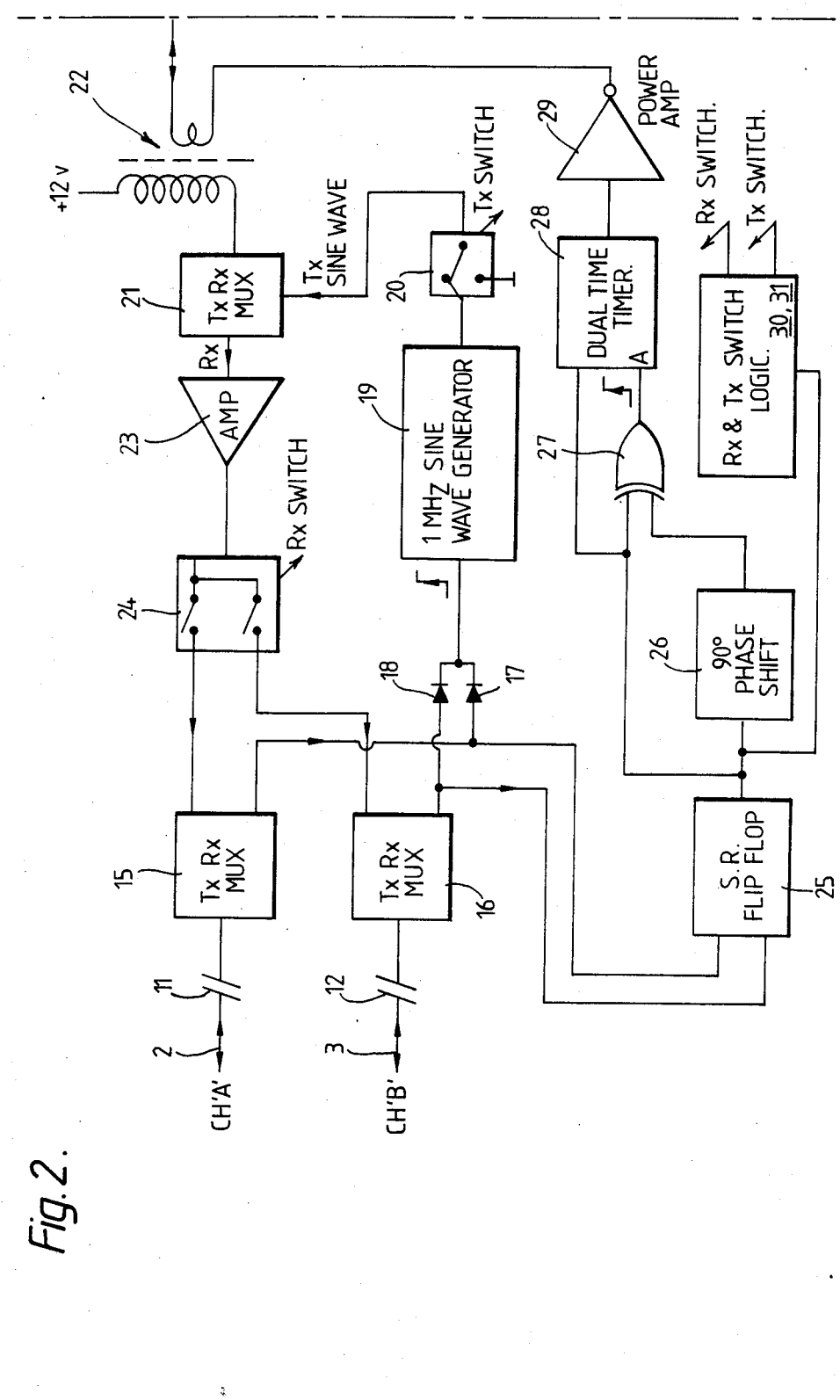
FIG. 2 is a simplified block diagram of the interface means of FIG. 1.
Figure 2:
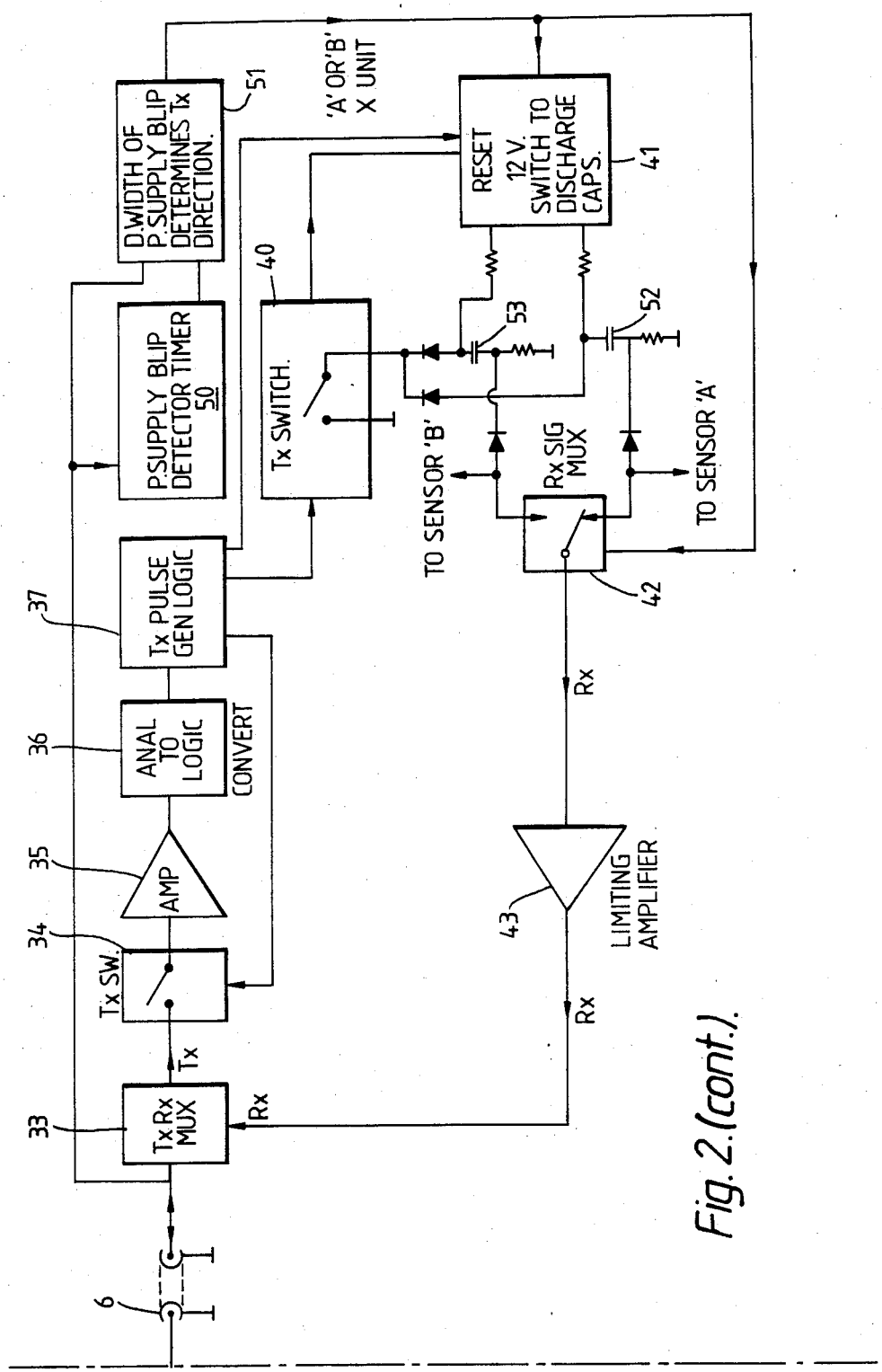
Figure 3:
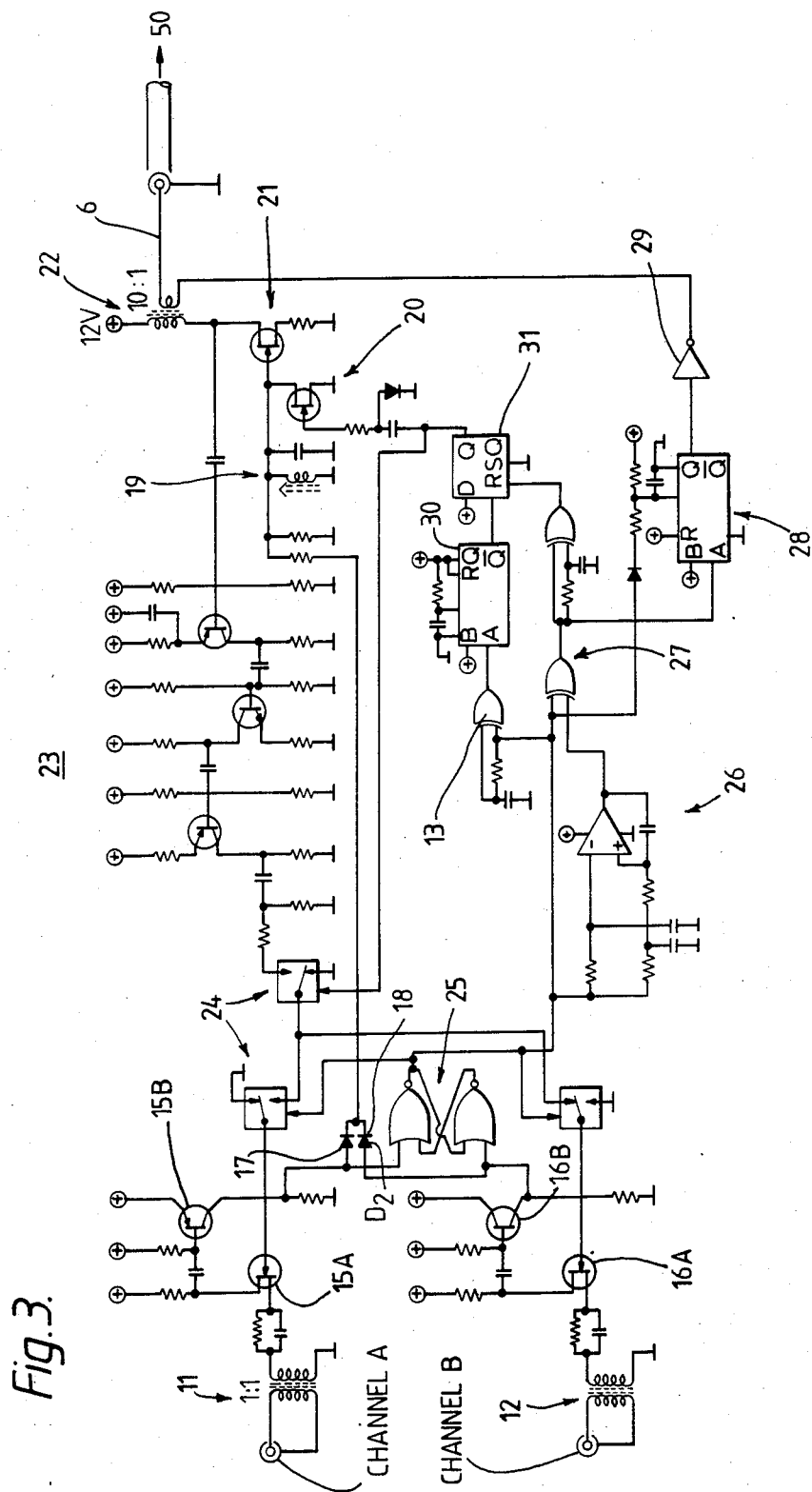
FIG. 3 is a circuit diagram of the master unit shown in FIGS. 1 and 2.

The master unit is illustrated in more detail in FIGS. 2 and 3. The cables 2, 3 are connected to the respective toroidal transformers 11, 12 to provide isolation between the monitor 1 and the master unit 4. The signals on each channel are fed to respective multiplexers 15, 16 each comprising a pair of transistors 15A, 15B; 16A, 16B.

The multiplexers 15, 16 pass incoming transmit signals on lines 2, 3 to respective ones of a pair of diodes 17, 18 so that the transmit signals are combined and both fed to a 1 MHz sine wave generator 19. The generator 19 is formed by a 1 MHz tuned circuit which is rung by the incoming transmit signal. The 1 MHz signal is fed to a transmit switch 20 formed by a FET transistor. The signal is then fed from the transmit switch 20 to a multiplexer 21 formed by a transistor the transmit side of which defines an amplifier which impedance matches the signal into the coaxial cable 6 (in this case 50Ω). This is achieved by a matching transformer 22.

Figure 5A:
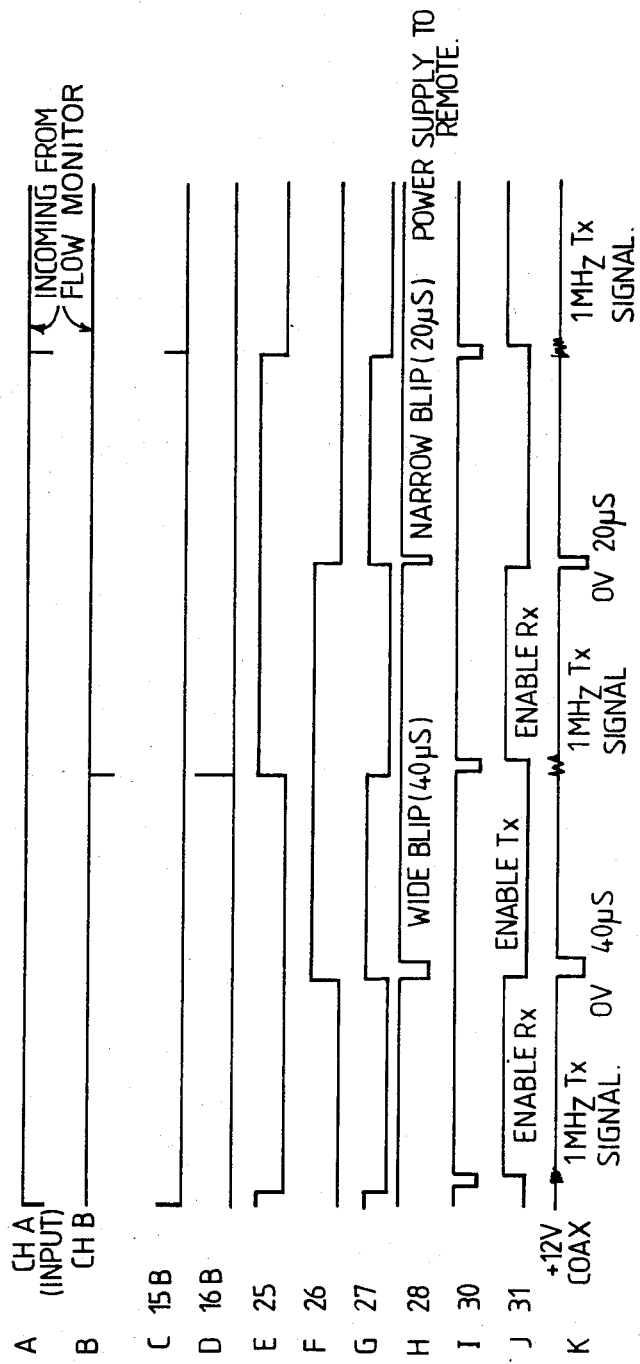
FIGS. 5a and 5b are pulse diagrams illustrating the output signals from various parts of the apparatus shown in FIGS. 3 and 4; and, FIG. 6 is a block diagram similar to FIG. 2 but of a second example.

Traces A, B in FIG. 5A illustrate the incoming transmit signals from the flow monitor 1. It will be seen that transmit signals alternate between channel A and channel B and each comprise a very high frequency pulse. These pulses are "squared up" by the transistors 15B, 16B which have collector outputs illustrated by traces C, D in FIG. 5A. Trace K illustrates the successive 1 MHz signals fed along the coaxial cable 6 in response to the transmit pulses.

In addition to transmitting signals along the coaxial cable 6, signals will be received by the master unit 4 from the coaxial cable 6 as a result of the receipt of signals by the transducers 8, 9. These received signals are passed via the transformer 22 to the multiplexer 21 and are then amplified by an amplifier 23 and fed to the appropriate multiplexer 15, 16 via a receive switch 24. The receive switch 24 is controlled such that signals received by the transducer 8 (which have originated from the transducer 9 ie. channel B) are fed to the multiplexer 16 and vice versa. The received signals fed to the monitor 1 are then processed in a conventional manner.

In addition to passing transmit signals along the coaxial cable 6, the master unit 4 also supplies direction information to the remote unit 7. This is to tell the remote unit 7 which transducer 8, 9 should respond to the following 1 MHz transmit signal. In order to achieve this, the master unit 4 includes a SR flip-flop 25 which toggles in phase with the transmit signals. The output of the flip-flop 25 is illustrated by trace E in FIG. 5A where it will be seen that at each pulse in channel A and channel B there is a switch in the logical output of the flip-flop.

This output signal is then fed to a 90° phase shift circuit 26 whose output signal is illustrated by trace F in FIG. 5A. It will be seen that the output signal from the circuit 26 changes state at a point midway between any two transmit pulses (irrespective of the actual pulse rate being used). The phase shifted signal from the circuit 26 and the non-phase shifted signal from the flip-flop 25 are each fed to respective inputs of an EOR gate 27 whose output signal has a rising edge which corresponds to the mid point between two transmit pulses. This is illustrated by trace G in FIG. 5A.

This rising edge is used to trigger a timer 28 whose output pulse width is either 20 or 40 microseconds depending on the state of trace E (ie. dependant on which was the last channel to transmit). This is illustrated by trace H in FIG. 5A where it will be seen that the timer 28 normally outputs a +12 volt signal which is switched to zero volts for periods of 20 or 40 microseconds. The normally low Q output of the timer 28 is buffered by a power amplifier 29 which is an inverting hex buffer with all sections in parallel. This normally high output is the power supply for the remote unit 7 and is fed down the coaxial cable 6 via the matching transformer secondary 22.

The switches 20, 24 are controlled by a logic element 30 and a D flip-flop 31. The element 30 receives the output signal (Trace E) from the flip-flop 25 via an EOR gate 13 while the D flip-flop 31 receives the output signals from the circuit 26 and the flip-flop 25 via the EOR gate 27. The signal from flip-flop 25 causes the logic element 30 to issue short pulses corresponding to each transmit signal which resets the flip flop 31. The flip flop 31 switches its logic output low (SET) in response to the receipt of logic high signals from the EOR gate 27 (trace G, FIG. 5A). The flip-flop 31 switches its logic output state in response to the receipt of signals from the element 30 and from the EOR gate 27 so that the switches 24, 20 are alternately actuated. The output signals from the element 30 and flip-flop 31 are shown by traces I, J respectively in FIG. 5A. When the Q output of the flip-flop 31 is high the receive switch 24 is enabled and the transmit switch 20 disabled while when the Q output is low the transmit switch 20 is enabled and the receive switch 24 disabled.

Remote Unit

Figure 4:
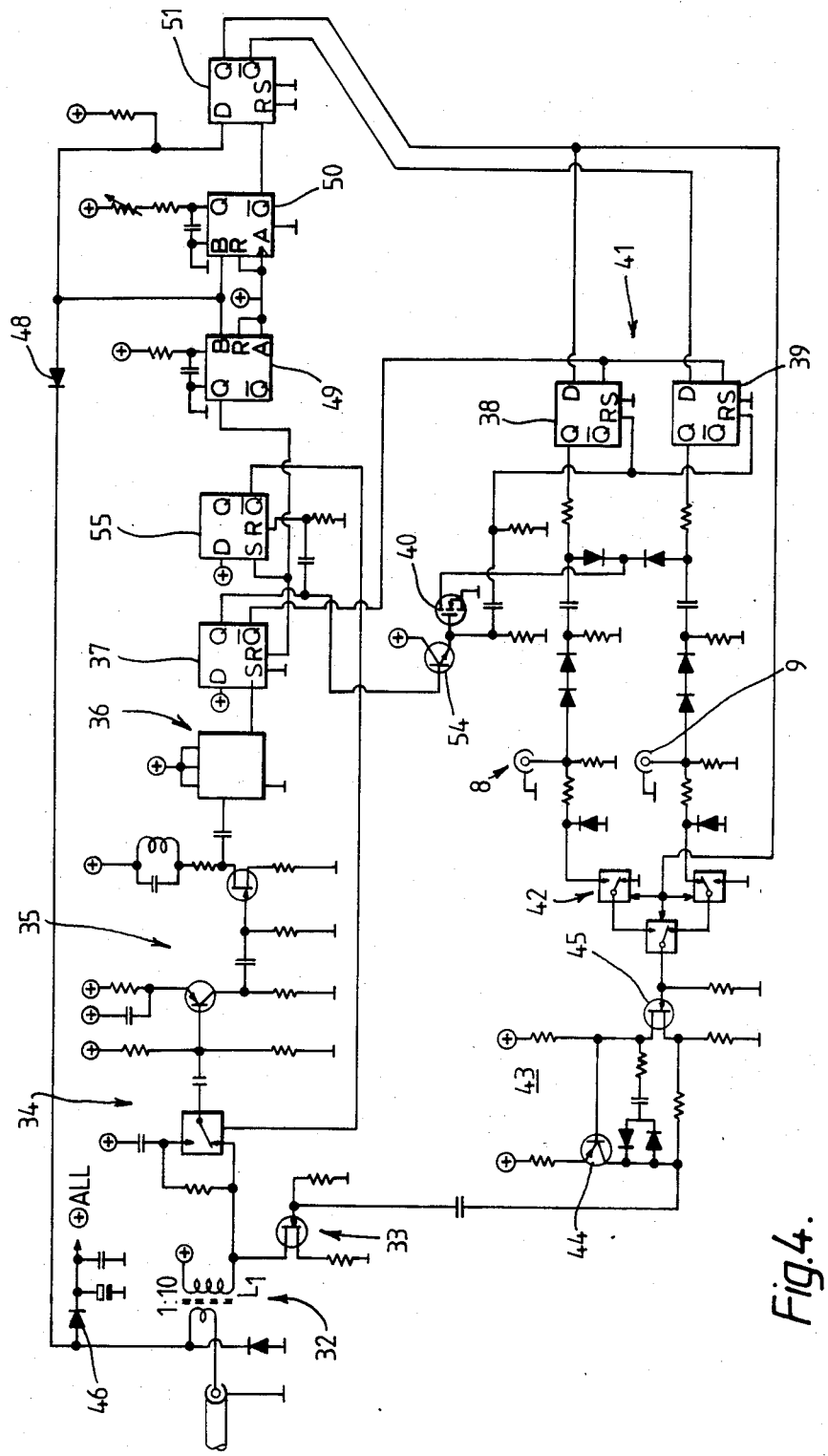
FIG. 4 is a circuit diagram of the remote unit shown in FIGS. 1 and 2.
Figure 5B:
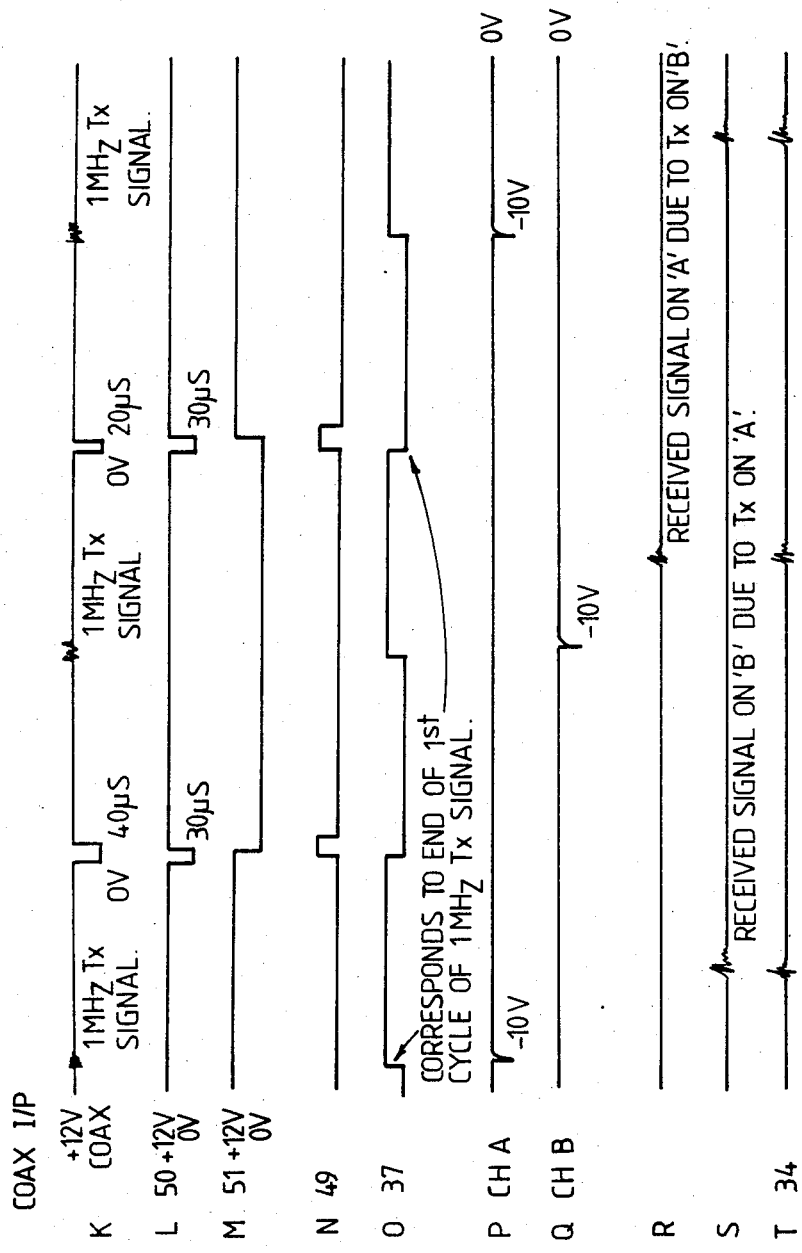

Signals transmitted along the coaxial cable 6 are input to a transformer 32 (FIG. 4) connected to a multiplexer 33 formed by a transistor. The incoming transmit signal is passed by the multiplexer 33 via a transmit switch 34 to an amplifier 35. The amplified incoming transmit signal is then passed to an analogue to logic converter 36. This conversion corresponds to the zero crossing of the incoming transmit signal. A logic circuit 37 comprising a D flip-flop has a clock input which receives the signal from the analogue to logic converter 36 and a $\overline{Q}$ output which is connected to the clock inputs of a pair of D flip-flops 38, 39. In addition, the Q output of the flip-flop 37 is connected via a switch 40 to the reset inputs of the flip-flops 38, 39. Trace O in FIG. 5B illustrates the output signal from the Q output of the D flip-flop 37. The rising edge of the Q output signal corresponds to the first zero crossing of the incoming 1 MHz signal. The flip-flops 38, 39 form a switch 41.

The receipt of a signal by the switch 41 causes one of the transducers 8, 9 to be fired with a high speed pulse causing an acoustic signal to be transmitted into the flowing fluid.

A short time later the transmitted acoustic signal will be received by the other transducer. This received signal is fed to a multiplexer 42 which passes the signal via an amplifier 43 comprising transistors 44, 45 to the multiplexer 33. This multiplexer matches the incoming signal with the 50Ω coaxial cable 6 to return the signal along the coaxial cable to the master unit 4.

In addition to the 1 MHz pulses received along the coaxial cable 12 there is a substantially constant dc 12 volt level (Trace K) which is fed via a diode 46 to a capacitor 47 to provide the 12 volts necessary for the running power of the remote unit 7.

The incoming signals are also fed via a diode 48 to a pair of timers 49, 50 and to the D input of a D flip-flop/latch 51. The clock input of the latch 51 is connected to the $\overline{Q}$ output of the timer 50.

The timer 50 is adjusted to time out in 30 microseconds. The D input of the latch 51 is the same pulse as is input to the timer 50, and these two elements in combination will regenerate at the Q output of the latch 51 the original logic signal in the master unit. Trace L in FIG. 5B illustrates the $\overline{Q}$ output from timer 50 while trace M illustrates the Q output of the latch 51. Trace M should be compared with trace F in the master unit 4.

The output signals from the latch 51 are used to determine the channel which is to be used by the following transmit signal. The logic outputs from the latch 51 control the position of the multiplexer switch 42 and the charging of transmit capacitors 52, 53. This is achieved via the flip-flops 38, 39 whose D inputs are connected to the Q, $\overline{Q}$ outputs respectively of the latch 51. The flip-flops 38, 39 are clocked by the $\overline{Q}$ output from the flip-flop 37 which itself is triggered by the incoming pulses. This means that either the capacitor 52 or the capacitor 53 will charge up to the 12 volt level depending on the logical nature of the output from the flip-flop 51.

Traces P, Q in FIG. 5B illustrate the pulses generated by the capacitors 52, 53 for ringing the respective transducers while traces R, S illustrate the signals received by the respective transducers.

When the next transmit signal is received from the master unit 4, a single rising logic will be generated by flip-flop 37 and a buffer 54 will switch on the switch 40 very quickly, discharging either capacitor 52 or capacitor 53 into its respective transducer. The same signal that switches the switch 40 also resets the switch 41 to remove the capacitor charging current.

The Q output of the flip-flop 37 is also connected to the reset port of a D flip-flop 55. The $\overline{Q}$ output of this flip-flop 55 is connected to the switch 34. This latter connection is to prevent a positive feedback loop being created as a result of the amplified received signal at the transformer 32.

In practice, the timing is such that a channel selection signal followed by a 1 MHz pulse are transmitted along the coaxial cable 6 to the remote unit 7 causing one of the transducers 8,9 to transmit a signal into the fluid. The other transducer senses the signal which is transmitted back to the master unit 4 and then the master unit 4 automatically causes the next channel selection signal and 1 MHz pulse to be transmitted along the coaxial cable 6. A comparison of Traces T and K illustrate that the transmission of each 1 MHz transmit signal is followed by the transmission of a received signal and then the transmission of either a 40 μs or 20 μs channel selection signal.

Figure 6:
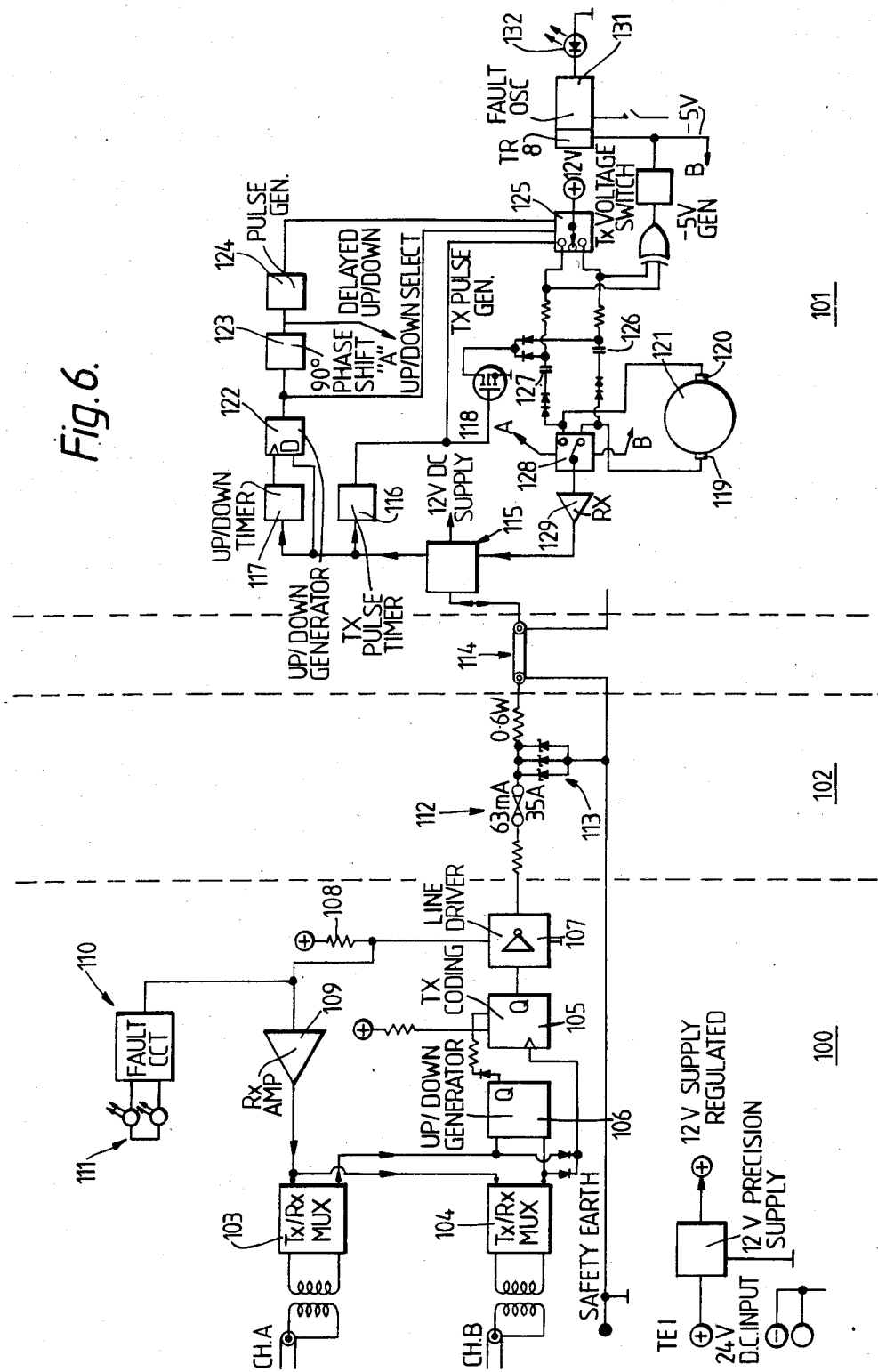

A second example of an interface system as shown in block diagram form in FIG. 6. The interface system of FIG. 6 comprises a master unit 100, a remote unit 101, and a barrier unit 102. The barrier unit 102 is optional and is only required for intrinsically safe (IS) situations and in practice the barrier unit 102 will be physically fitted into the master unit 100.

A flow meter (not shown) will be connected to the master unit 100 in a similar manner to the flow monitor 1 of FIG. 1 via channels A and B. Each channel is connected with a respective transmit/receive multiplexer 103, 104 which are bidirectional amplifiers and convert an incoming transmit pulse to a 12 volt logic pulse to trigger a transmit coding timer 105 and to receive and match a received signal (originating from the remote unit 101) back into both flow monitor inputs. The transmit coding timer 105 is triggered each time a transmit pulse is received from the flow monitor on either channel. At the same time, the individual transmit pulses are used to set and reset an up/down generator 106. This generator 106 is a flip/flop. The output of the generator 106 modifies the timing components of the transmit coding timer 105 such that it gives either a 2.5 or a 5 microsecond pulse depending upon the transmit direction. The output signal from the timer 105 drives a line driver 107 coupled with the barrier unit 102.

The line driver comprises a pair of transistors (not shown) one of which is normally switched on to provide the 12 volt supply to the remote unit 101 via a resistor 108. When the timer 105 operates, this transistor is switched off and the line shorted to ground by the other transistor for the duration of the pulse. The falling edge is the time position of the originating transmit pulse, and the duration of the pulse provides the direction information in a similar manner to that described in connection with the first example.

A signal originating from the remote unit 101 received by the master unit 100 is a 1 MHz supply current modulation and this is detected as a voltage change across the resistor 108. A video amplifier 109 amplifies this received modulation and drives both multiplexors 103, 104 to pass the received signal to the flow meter. The flow meter, in operation, will only sense a signal at one of its inputs.

A fault circuit 110 is provided to monitor the DC component across the resistor 108 to check the remote unit current. If this current becomes unacceptable then a pair of LEDs 111 will be lit.

The barrier unit 102 is, as previously mentioned, an optional unit and comprises a minimum series resistance 112 and three parallel connected zener diodes 113. The zener diodes 113 are effectively open circuit at the working voltage.

The barrier unit 102 is connected with the remote unit 101 via a single 50Ω coaxial cable 114.

The input to the remote unit 101 comprises a multiplexer 115 which is able to pass signals bidirectionally. The multiplexor 115 separates and filters the 12 volt supply, amplifies and conditions the incoming transmit pulse, and matches the high impedance output of the receive amplifier to that of the coaxial cable 114. The incoming transmit pulse received by the remote unit 101 is first amplified and inverted by the multiplexer unit 115 and then triggers two timers 116, 117. The timer 116 generates a pulse with a fixed width of about 50 microseconds which is used to switch on a switch 118. This causes the original high speed pulse to be regenerated for the transducers 119, 120 mounted to a pipe 121. The timer 117 is part of an UP/DOWN decoding circuit including an UP/DOWN generator 122 and each transmit pulse sent to the decoding circuit by the master unit causes the decoding circuit to provide a pulse of four microseconds width (ie. midway between 2.5 and 5 microseconds). The flip-flop 122 separates out the UP/DOWN information.

The output signal from the flip-flop 122 is fed to a phase shifter 123 which applies a 90° phaseshift to produce logic level changes half way between transmit pulses. The output from the phaseshifter 123 is fed to an EXOR gate 124 which generates a short positive pulse at each transmission causing a transmit voltage switch 125 to be clocked to allow either a capacitor 126 or a capacitor 127 to be charged. The information from the UP/DOWN generator determines which of the capacitors 126, 127 is charged.

When a transmit pulse is received from the master unit 100, the transmit pulse generator 118 will discharge the charged capacitor into its respective transducer.

An analogue switch 128 is driven with the phase shifted UP/DOWN logic from the phase shifter 123 and connects a receive amplifier 129 with the receiving transducer. The output from the amplifier 129 is coupled to the multiplexer 115 so that the received signal can be fed back to the master unit 100.

The charging of the capacitors 126, 127 is also used to generate a −5 volt supply for the switch 128 and to bias off a fault circuit 130. If a fault occurs within the remote unit 101, then the probability is that it will be reflected in incorrect charging of the capacitors. This will reduce the −5 volt supply thus holding off the fault oscillator 131 and cause it to operate, flashing a fault LED 132. This LED requires current to illuminate and the fault circuit in the master unit 110 will detect the pulsating line current and flash the appropriate LEDs 111.

I claim:

1. Interface means for connection to a fluid flow monitoring assembly comprising signal generating means and signal receiving means for transmitting signals into a flowing fluid and for receiving the signals after transmission through the fluid respectively; and monitoring means for controlling the transmission of signals by the signal generating means, sensing the signals received by the signal receiving means, and thereby monitoring the fluid flow, wherein said signal generating means and said signal receiving means are adapted to transmit and receive respectively signals passing through said fluid along at least two different paths and said monitoring means has one communication port for each transmission path, the interface means comprising first and second converting assemblies linked by a common signal path, said first converting assembly being adapted to be connected with said communication ports and said second converting assembly being adapted to be connected to said signal generating means and said signal receiving means, wherein said converting assemblies are arranged to pass first signals along said common signal path in response to the receipt of signals from said communication ports or from said signal receiving means respectively, said first converting assembly being responsive to first control signals to cause signals corresponding to signals received from said common signal path to be passed to appropriate ones of said communication ports, and said second converting assembly being responsive to second control signals to cause signals to be transmitted into said fluid by said signal generating means along appropriate paths determined by said second control signals.

2. Interface means according to claim 1, wherein said first converting assembly comprises a power supply generator for generating a power supply signal which is passed to said second converting assembly.

3. Interface means according to claim 1, wherein one converting assembly includes means for generating control signals which are passed along said common signal path in association with said first signals from that converting assembly and constitute said first or second control signals for the other converting assembly.

4. Interface means according to claim 3, wherein said converting assembly which generates said control signals is said first converting assembly connected to said communication ports.

5. Interface means according to claim 3, wherein said first converting assembly comprises a power supply generator for generating a power supply signal which is passed to said second converting assembly, and wherein said first and second control signals comprise modulations of said power supply signal.

6. Interface means according to claim 1, wherein said control signals comprise pulses of different widths, said widths corresponding to the different directions in which signals are transmitted through said fluid.

7. Interface means according to claim 1, wherein said common signal path is defined by a single coaxial cable.

8. A fluid flow monitoring assembly comprising signal generating means and signal receiving means for transmitting signals into a flowing fluid and for receiving the signals after transmission through the fluid respectively; monitoring means for controlling the transmission of signals by the signal generating means, sensing the signals received by the signal receiving means, and thereby monitoring the fluid flow, in which said signal generating means and said signal receiving means are adapted to transmit and receive respectively signals passing through said fluid along at least two different paths and said monitoring means has one communication port for each transmission path; and interface means according to claim 1 coupled between said monitoring means and said signal generating means and said signal receiving means.

9. Interface means for connecting the signal generating means and the signal receiving means to the monitoring means of a fluid flow monitoring assembly comprising signal generating means and signal receiving means for transmitting signals into a flowing fluid and for receiving the signals after transmission through the fluid respectively and monitoring means for controlling the transmission of signals by the signal generating means, sensing the signals received by the signal receiving means, and thereby monitoring the fluid flow, the interface means comprising first and second converting assemblies, said first converting assembly being adapted to couple a transmit pulse from said monitoring means into a transmission medium for conveying said transmit pulse and a substantially constant power supply signal to said second converting assembly which is responsive to said power supply signal to convert said transmit pulse from said transmission medium to a pulse for application to said signal generating means.

10. Interface means according to claim 9, wherein said first converting assembly is connectable to communication ports of said monitoring means, said first converting assembly being responsive to first control signals to cause signals corresponding to signals received from said transmission medium to be passed to appropriate ones of said communication ports, and said second converting assembly being responsive to second control signals to cause signals to be transmitted into said fluid by said signal generating means along appropriate paths.

11. Interface means according to claim 10, wherein one converting assembly includes means for generating control signals which are passed along said transmission medium in association with said first signals from that converting assembly and constitute said first or second control signals for the other converting assembly.

12. Interface means according to claim 11, wherein said converting assembly which generates said control signals is said first converting assembly connected to said communication ports.

13. Interface means according to claim 12, wherein said first converting assembly comprises a power supply generator for generating said power supply signal which is passed to said second converting assembly and wherein said first and second control signals comprise modulations of said power supply signal.

14. Interface means according to claim 10, wherein said control signals comprise pulses of different widths, said widths corresponding to the different directions in which signals are transmitted through said fluid.

15. Interface means according to claim 9, wherein said transmission medium is defined by a single coaxial cable.

16. A fluid flow monitoring assembly comprising signal generating means and signal receiving means for transmitting signals into a flowing fluid and for receiving the signals after transmission through the fluid respectively; monitoring means for controlling the transmission of signals by the signal generating means, sensing the signals received by the signal receiving means, and thereby monitoring the fluid flow, in which said signal generating means and said signal receiving means are adapted to transmit and receive respectively signals passing through said fluid along at least two different paths and said monitoring means has one communication port for each transmission path; and interface means according to claim 9 coupled between said monitoring means and said signal generating and said signal receiving means.

17. A method of operating a fluid flow monitoring assembly comprising signal generating means and signal receiving means for transmitting signals into a flowing fluid and for receiving the signals after transmission through the fluid respectively; and monitoring means for controlling the transmission of signals by the signal generating means, sensing the signals received by the signal receiving means, and thereby monitoring the fluid flow, in which said generating means and said signal receiving means are adapted to transmit and receive respectively signals passing through said fluid along at least two different paths and said monitoring means has one communication port for each transmission path, in combination with interface means comprising first and second converting assemblies linked by a common signal path, said first converting assembly being adapted to be connected with said communication ports and said second converting assembly being adapted to be connected to said signal generating means and said signal receiving means, wherein said converting assemblies are arranged to pass first signals along said common signal path is response to the receipt of signals from said communication ports or from said signal receiving means respectively, said first converting assembly being responsive to first control signals to cause signals corresponding to signals received from said common signal path to be passed to appropriate ones of said communication ports, and said second converting assembly being responsive to second control signals to cause signals to be transmitted into said fluid by said signal generating means along appropriate paths the method comprising
 (1) passing a first transmit signal along said common signal path in association with a transmission direction control signal to cause a signal to be transmitted into said fluid along one path;
 (2) sensing for a signal at a communication port representing the receipt by said signal receiving means of a signal transmitted through the fluid;
 (3) passing a second transmit signal along said common signal path in association with a transmission direction control signal to cause a signal to be transmitted into said fluid along another path; and
 (4) sensing for a signal at another communication port representing the receipt by said signal receiving means of said signal transmitted through said fluid.

* * * * *